United States Patent
Gibson et al.

(10) Patent No.: US 10,055,533 B2
(45) Date of Patent: Aug. 21, 2018

(54) VISUALIZATION OF ANALYSIS PROCESS PARAMETERS FOR LAYOUT-BASED CHECKS

(71) Applicant: Mentor Graphics Corporation, Wilsonville, OR (US)

(72) Inventors: Patrick D Gibson, Tualatin, OR (US); Farhad T Kharas, Wilsonville, OR (US); I-Shan Chang, Hsin Chu (TW); MacDonald Hall Jackson, III, Corvallis, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 14/716,775

(22) Filed: May 19, 2015

(65) Prior Publication Data

US 2016/0342728 A1    Nov. 24, 2016

(51) Int. Cl.
    *G06F 17/50*    (2006.01)
(52) U.S. Cl.
    CPC ...... *G06F 17/5081* (2013.01); *G06F 17/5068* (2013.01); *G06F 2217/82* (2013.01)
(58) Field of Classification Search
    None
    See application file for complete search history.

(56) References Cited

U.S. PATENT DOCUMENTS

| | | | |
|---|---|---|---|
| 6,553,542 B2 * | 4/2003 | Ramaswamy | G06F 17/5036 716/112 |
| 7,114,137 B2 * | 9/2006 | Hayashi | G06F 17/5036 716/115 |
| 7,243,317 B2 * | 7/2007 | Wang | G06F 17/5081 716/112 |
| 7,617,467 B2 * | 11/2009 | Bell | G06F 17/5036 703/14 |
| 7,694,247 B2 * | 4/2010 | Esmark | G06F 17/5036 716/136 |
| 8,079,005 B2 * | 12/2011 | Lai | G06F 17/5081 716/111 |
| 8,230,382 B2 * | 7/2012 | Gauthier, Jr. | G06F 17/5036 703/14 |
| 8,645,895 B2 * | 2/2014 | Bergmann | G06F 17/5036 716/106 |
| 8,694,926 B2 * | 4/2014 | Reber | G06F 17/5081 716/110 |
| 9,378,324 B2 * | 6/2016 | Newcomb | G06F 17/5081 |
| 9,449,139 B2 * | 9/2016 | Feng | G06F 17/5077 |
| 2004/0243949 A1 | 12/2004 | Wang et al. | |
| 2008/0115097 A1 * | 5/2008 | Pikus | G06F 17/5081 716/52 |

(Continued)

OTHER PUBLICATIONS

Ershov et al., "EDA Software for Verification of Metal Interconnects in ESD Protection Networks at Chip, Block, and Cell Level," *Electrical Overstress Electrostatic Discharge Symp.*, 7 pp. (Sep. 2013).

(Continued)

*Primary Examiner* — Leigh Garbowski
(74) *Attorney, Agent, or Firm* — Klarquist Sparkman, LLP

(57) ABSTRACT

Techniques and mechanisms for marking the parameters of a circuit analysis process for visual identification are disclosed. The visually-identified parameters can then be employed with the results of the circuit analysis to debug the layout design.

30 Claims, 9 Drawing Sheets

(56) References Cited

U.S. PATENT DOCUMENTS

| | | | |
|---|---|---|---|
| 2008/0141193 A1* | 6/2008 | Pikus | G06F 17/5081 |
| | | | 716/50 |
| 2008/0168410 A1* | 7/2008 | Pikus | G06F 17/5081 |
| | | | 716/52 |
| 2010/0083208 A1 | 4/2010 | Lai et al. | |
| 2010/0161304 A1* | 6/2010 | Voldman | G06F 17/5045 |
| | | | 703/14 |

OTHER PUBLICATIONS

International Search Report and Written Opinion dated Aug. 24, 2016, from International Patent Application No. PCT/US2016/033239, 30 pp.

Kollu et al., "Unifying Design Data During Verification: Implementing Logic-Driven Layout Analysis and Debug," *IEEE Int'l Conf. on Design & Technology*, 5 pp. (May 2012).

Marquardt et al., "Topology-Aware ESD Checking: A New Approach to ESD Protection," *IEEE Electrical Overstress/Electrostatic Discharge Symp.*, 6 pp. (Sep. 2012).

Smedes et al., "A DRC-based check tool for ESD layout verification," *IEEE EOS/ESD Symp.*, 10 pp. (Aug. 2009).

\* cited by examiner

```
Simulation Setup
Sources:
Sinks:
Connections:

Nets:
#1 - NET_1
#2 - VDD

Sources:
#1 - PORT-VDD  tm : 1000 mA

Sinks:
#1 - PORT NET_1  tm : 0.0 V

Connections:
#1 - SG_1 connects SG_B  : 0 ohms

Short Groups:
SG_A - SG_1 Pin Locations
#1 - CellA   X120/X622/v   X120/X622/v_cellport m2
#2 - CellA   X120/X622/v_PERC_1   X120/X622/v_PERC_1_cellport m2
#3 - CellA   X120/X622/v_PERC_2   X120/X622/v_PERC_2_cellport m2
#4 - CellA   X120/X622/v_PERC_3   X120/X622/v_PERC_3_cellport m2
#5 - CellA   X120/X622/v_PERC_4   X120/X622/v_PERC_4_cellport m2
#6 - CellA   X120/X622/v_PERC_5   X120/X622/v_PERC_5_cellport m2
```

FIG. 9

VISUALIZATION OF ANALYSIS PROCESS PARAMETERS FOR LAYOUT-BASED CHECKS

FIELD OF USE

The present invention is directed to techniques for marking features of layout design data. Various implementations of the invention may be particularly useful for marking circuit analysis parameters in layout design data. The marked parameters can then be employed with the results of the circuit analysis to debug the layout design.

BACKGROUND

Electronic circuits, such as integrated microcircuits, are used in a variety of products, from automobiles to microwaves to personal computers. Designing and fabricating microcircuit devices typically involves many steps, known as a "design flow." The particular steps of a design flow often are dependent upon the type of microcircuit being designed, its complexity, the design team, and the microcircuit fabricator or foundry that will manufacture the microcircuit. Typically, software and hardware "tools" will verify a design at various stages of the design flow by running software simulators and/or hardware emulators, and errors in the design are corrected.

Several steps are common to most design flows. Initially, the specification for the new microcircuit is transformed into a logical design, sometimes referred to as a register transfer level (RTL) description of the circuit. With this logical design, the circuit is described in terms of both the exchange of signals between hardware registers and the logical operations that are performed on those signals. The logical design typically employs a Hardware Design Language (HDL), such as the Very high speed integrated circuit Hardware Design Language (VHDL). The logical of the circuit is then analyzed, to confirm that the logic incorporated into the design will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. This logical design generally corresponds to the level of representation displayed in conventional circuit diagrams. Preliminary timing estimates for portions of the circuit may be made at this stage, using an assumed characteristic speed for each device. In addition, the relationships between the electronic devices are analyzed, to confirm that the circuit described by the device design will correctly perform the functions desired for the circuit. This analysis is sometimes referred to as "formal verification."

Once the relationships between circuit devices have been established, the design is again transformed, this time into a physical design that describes specific geometric elements. This type of design often is referred to as a "layout" design. The geometric elements define the shapes that will be created in various materials to actually manufacture the circuit device components (e.g., contacts, gates, etc.) making up the circuit. While the geometric elements are typically polygons, other shapes, such as circular and elliptical shapes, also may be employed. These geometric elements may be custom designed, selected from a library of previously-created designs, or some combination of both. Geometric elements also are added to form the connection lines that will interconnect these circuit devices. Layout tools (often referred to as "place and route" tools), such as Mentor Graphics' IC Station or Cadence's Virtuoso, are commonly used for both of these tasks.

With a layout design, each physical layer of the microcircuit will have a corresponding layer representation, and the geometric elements described in a layer representation will define the relative locations of the circuit device components that will make up a circuit device. Thus, geometric elements in the representation of a metal layer will define the locations in a metal layer where conductive wires will be formed to connect other circuit devices. Typically, a designer will perform a number of analyses or "checks" on the layout design. For example, the layout design may be analyzed to confirm that it accurately represents the circuit devices and their relationships described in the device design. The layout design also may be analyzed to confirm that it complies with various design requirements, such as minimum spacings between geometric elements. Still further, it may be modified to include the use of redundant or other compensatory geometric elements intended to counteract limitations in the manufacturing process, etc. These processes on the physical layout design data are often referred to as "physical verification."

After the layout design has been finalized, then it is converted into a format that can be employed by a mask or reticle writing tool to create a mask or reticle for use in a photolithographic manufacturing process. Masks and reticles are typically made using tools that expose a blank reticle to an electron or laser beam. Most mask writing tools are able to only "write" certain kinds of polygons, however, such as right triangles, rectangles or other trapezoids. Moreover, the sizes of the polygons are limited physically by the maximum beam aperture size available to the tool. Accordingly, larger geometric elements in the layout design, or geometric elements that are not basic right triangles, rectangles or trapezoids (which typically is a majority of the geometric elements in a layout design) must be "fractured" into the smaller, more basic polygons that can be written by the mask or reticle writing tool.

Once the layout design has been fractured, then the layout design data can be converted to a format compatible with the mask or reticle writing tool. Examples of such formats are MEBES, for raster scanning machines manufactured by ETEC, an Applied Materials Company, the ".MIC" format from Micronics AB in Sweden, and various vector scan formats for Nuflare, JEOL, and Hitachi machines, such as VSB12 or VSB12. The written masks or reticles can then be used in a photolithographic process to expose selected areas of a wafer in order to produce the desired integrated circuit devices on the wafer.

Returning to the physical verification process, a designer may apply a variety of analysis processes to layout design data in order to confirm that the circuit manufactured from the design data will operate properly, such as point-to-point resistance checks, current density checks, and electromigration checks. One such analysis is an electrostatic discharge protection check to determine if electrostatic discharge protection circuits will operate as intended. To perform this analysis, a designer may employ an analysis tool, such as the Programmable Electrical Rule Checker (PERC) tool, part of the Calibre® family of electronic design automation tools available from Mentor Graphics® Corporation in Wilsonville, Oreg. Under a user's direction, the PERC tool can apply one or more representative current sources to selected portions of a layout design to solve for nodal voltages (that is, apply virtual current sources that represent the actual current sources that will be supplied to a device manufactured from the layout design data). This operation thus provides a representative voltage at each of the nodes in the selected portions of the layout design, from which the tool can determine representative current densities for the circuit elements (for example, interconnects) in those selected portions. Typically, the user will have the PERC tool create a color map showing the variations in representative current density. If a representative current density for an electrostatic discharge protection circuit exceeds the maximum current density allowed for that structure, then the designer must modify the design to correct this flaw.

As a practical matter, however, such a representative current density variation color map will be difficult for a designer to use to debug circuit layout design data. The layout design data typically will represent a number of structural layers, causing items on the color map to overlap. Further, this type of color map does not provide the designer with useful information for subsequently correcting design flaws, such as the location where the representative current is being injected, the location of the representative voltage sinks, etc.

BRIEF SUMMARY

Aspects of the invention relate to mechanisms for marking the parameters of a circuit analysis process for visual identification. The marked parameters can then be employed with the results of the circuit analysis to debug the layout design.

Some embodiments of the invention may be employed with an electrostatic discharge protection analysis to ensure that electrostatic discharge protection circuits will operate as intended. With these embodiments, one or more parameters of the electrostatic discharge protection analysis process are marked in the layout design data. For example, when representative current sources (or, alternatively, representative voltage values) are created and the representative nodal voltages are calculated during the electrostatic discharge protection analysis process, each of the representative current sources (or voltage values), representative voltage sinks, inter-net connections and short groups used in the process are specifically marked in the layout design data. When an error is identified by the electrostatic discharge protection analysis process, the designer can visually display the analysis parameters using the markers, to assist in correcting the layout design data. Still other embodiments of the invention may mark and display parameters for other circuit analyses, such as point-to-point resistance checks, current density checks, and electromigration checks These and other aspects of the invention will be described in more detail below with reference to the accompanying drawings.

BRIEF DESCRIPTION OF THE DRAWINGS

FIG. 9 illustrates an example of a user interface that may be provided to select analysis process parameters to view according to various embodiments of the invention.

DETAILED DESCRIPTION

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the invention.

Figure 1:
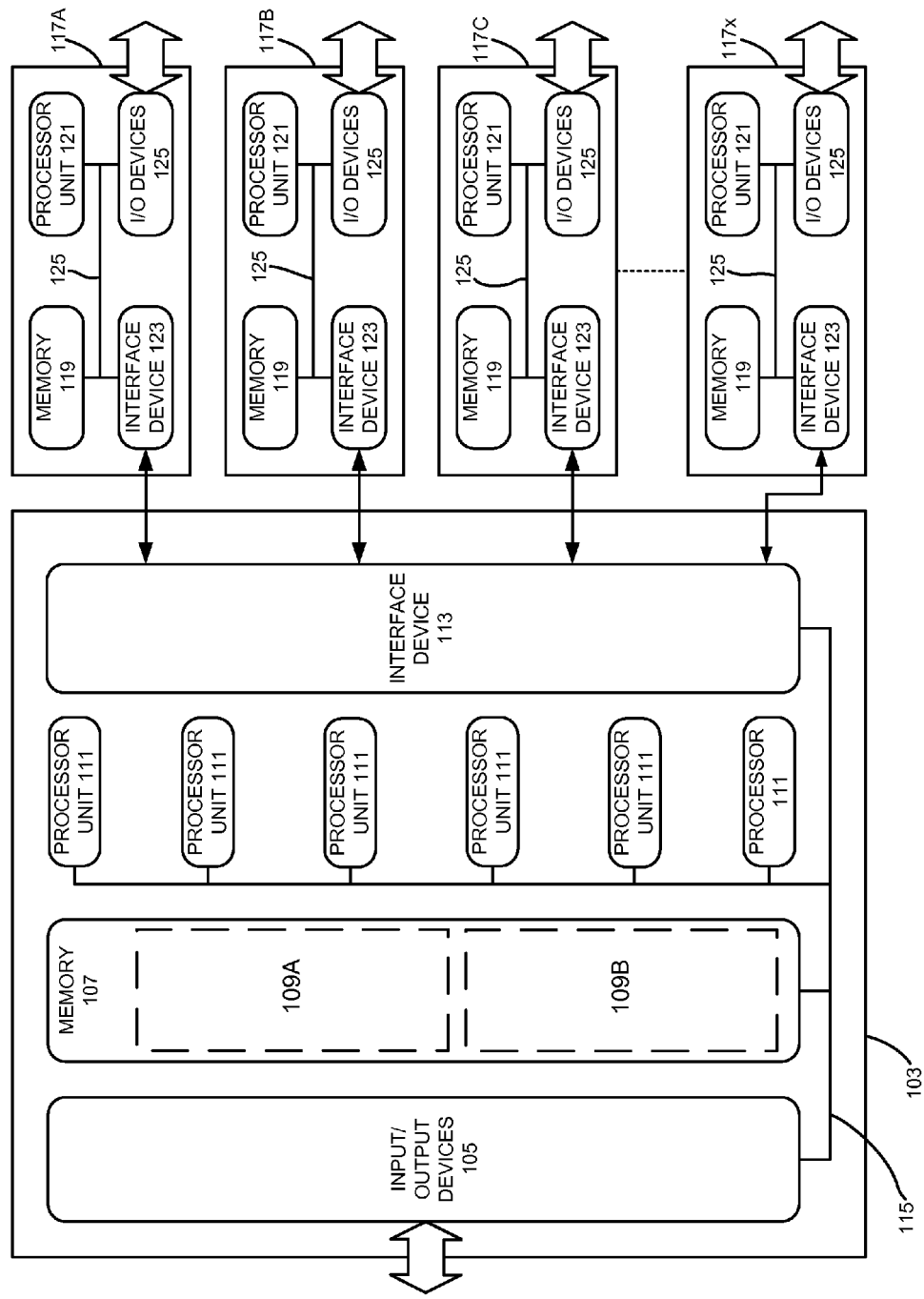
FIGS. 1 and 2 show an illustrative computing environment that may be used to implement various embodiments of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of non-transitory computer readable media that can be accessed by the master computer 103. As used herein, the term non-transitory refers to the ability to store information for subsequent retrieval at a desired time, as opposed to propagating electromagnetic signals. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
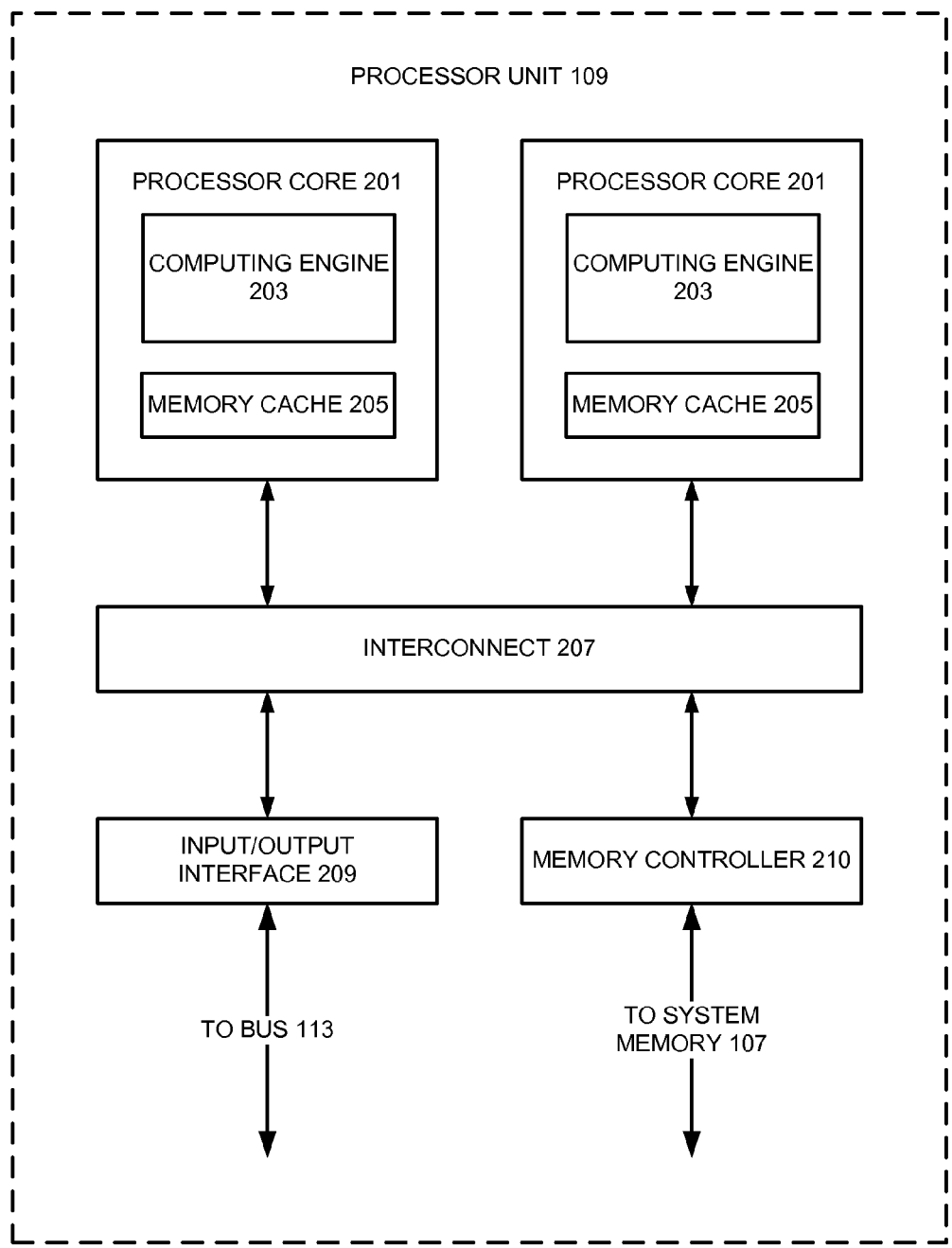

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. For example, it should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the invention, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the invention may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the invention, either the computer 103, one or more of the servant computers 117, or some combination of both may use two or more different interface devices 113 or 123 for communicating over multiple communication interfaces.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Parameter Marking Tool

Figure 3:
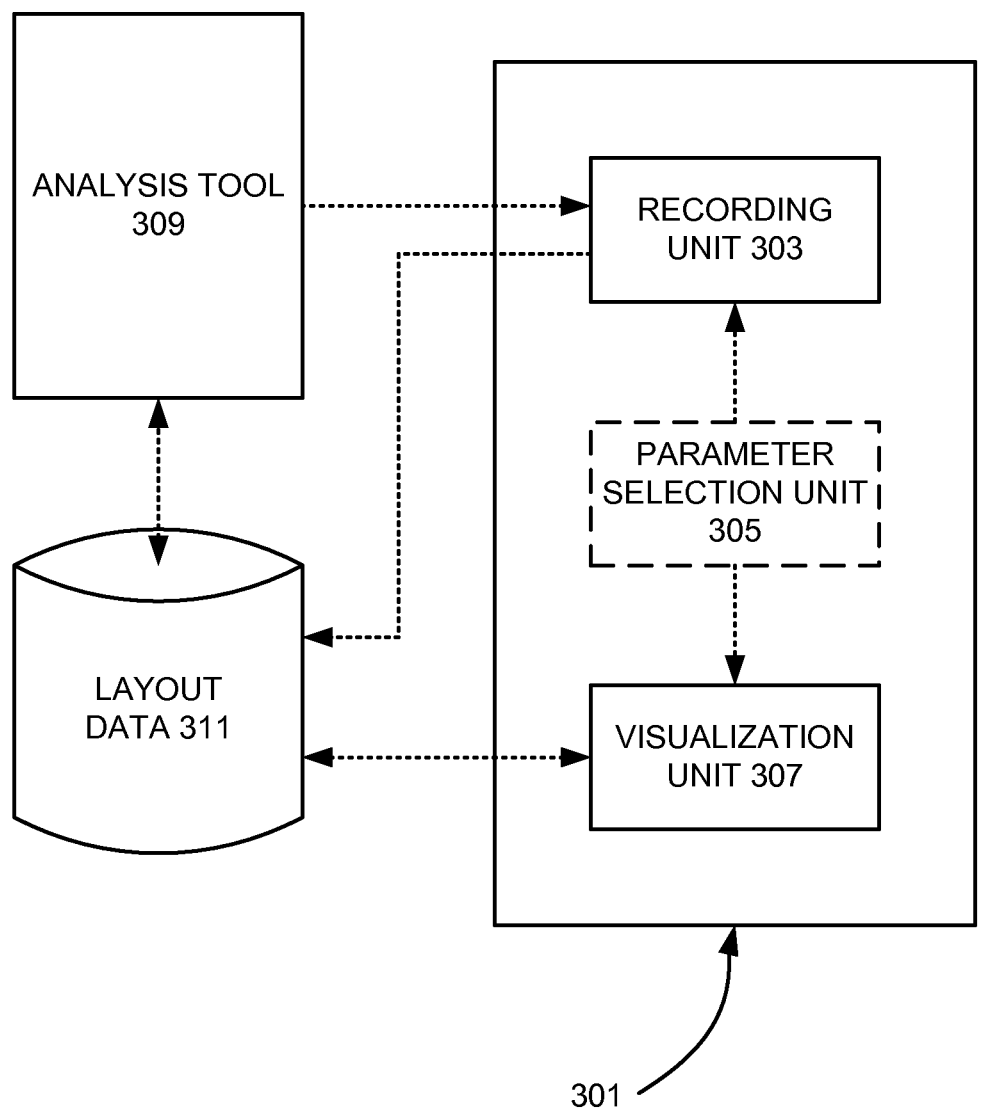
FIG. 3 illustrates an example of an analysis process parameter marking tool that may be provided according to various examples of the invention.

FIG. 3 illustrates an example of an analysis process parameter marking tool 301 that may be provided according to various examples of the invention. As seen in this figure, the analysis process parameter marking tool 301 includes a recording unit 303, an optional parameter selection unit 305, and a visualization unit 307. Typically, the analysis process parameter marking tool 301 will work in conjunction with an analysis tool 309 that analyzes layout data 311. As will be discussed in more detail below, the recording unit 303 records analysis process parameters used by the analysis tool 309 to perform an analysis process on the layout data 311. The visualization unit 307 then modifies the layout data to include markers that can be visually displayed to identify the analysis process parameters. With various implementations of an analysis process parameter marking tool 301 that include the optional parameter selection unit 305, the parameter selection unit 305 will allow a user of the analysis process parameter marking tool 301 (e.g., a designer for the integrated circuit layout design data being analyzed) to select which of the analysis process parameters are displayed.

With various embodiments of the invention, each of the recording unit 303, the optional parameter selection unit 305, and the visualization unit 307 may be implemented using one or more processors in a multiprocessor computing system's master computer, such as the master computer 103, one or more servant computers in a multiprocessor computing system, such as the servant computers 117, or some combination of both. Of course, still other embodiments of the invention may be implemented by, for example, one or more computer-readable devices having software instructions for performing the operations of these units stored thereon in a non-transitory manner, i.e., stored over a period of time such that they may be retrieved for use at any arbitrary point during that period of time.

It also should be appreciated that, while the recording unit 303, the parameter selection unit 305 and the visualization unit 307 are shown as separate units in FIG. 3, a single servant computer (or a single processor within a master computer) may be used to implement both of these units at different times, or components of both of these units at different times. In addition, the analysis process parameter marking tool 301 is shown in the illustrated example as being separate from the analysis tool 309. With various implementations of the invention, however, some or all of the functionality of the analysis process parameter marking tool 301 may be incorporated into the analysis tool 309.

Marking of Analysis Process Parameters

The operation of a parameter marking tool 301 according to various embodiments of the invention will now be explained with reference to the flowchart shown in FIG. 4. More particularly, the operation of a parameter marking tool 301 according to various implementations will be explained in reference to an illustrative electrostatic discharge protection analysis process.

With this type of process, a designer may employ an electronic design automation analysis tool, such as the Programmable Electrical Rule Checker (PERC) tool in the Calibre® family of electronic design automation tools available from Mentor Graphics® Corporation of Wilsonville, Oreg. To analyze the viability of electrostatic discharge protection devices in a selected portion of a circuit layout design, the PERC tool applies one or more representative current sources to that portion to solve for nodal voltages. As used herein, the term "representative current source" refers to a virtual current source representing an actual current source that would be applied to a device manufactured from the layout design data. Of course, it will be appreciated that various implementations of the invention may alternately or additionally apply representative voltage sources or values to perform such an analysis. As used herein, the term "representative voltage source" or "representative voltage value" refers to a virtual voltage source or a virtual voltage value representing an actual voltage source or actual voltage value that would be applied to or otherwise occur in a device manufactured from the layout design data.

To perform the analysis, the PERC tool also will have the resistance of each structure in the circuit. This resistance information may be obtained from, for example, a parasitic extraction process previously performed on the circuit portion. This parasitic extraction process may be performed using, for example, the Calibre® xACT™ tool also available from Mentor Graphics® Corporation of Wilsonville, Oreg.

The PERC tool will have resistance values for inter-net connections as well. These inter-net connections typically will be active devices connecting two nets, such as transistors or diodes. In some instances, the resistance values of these inter-net connections may be assigned in advance by a designer, or determined based upon their physical characteristics (for example, the width of a polygon representing a the channel of a transistor connecting multiple nets). Also, to perform the electrostatic discharge protection analysis, the PERC tool will have information identifying "short groups." As will be appreciated by those of ordinary skill in the art, a short group is a group of devices used in parallel to distribute a current, where all common points are treated as being held at the same potential. For example, a group where each device input pin is treated as being held at the same potential by a parasitic analysis process is generally considered a short group. The identification of a short group may be made manually by a user of the PERC tool, or identified automatically based upon specified characteristics for a short group.

Using the representative current or voltage information, the resistance information and the identification of short groups, the PERC tool can determine a representative voltage at each of the circuit nodes (that is, the nodes between voltage drops) in the selected portions of the layout design. From this, the PERC tool can then determine representative current densities for the circuit elements, such as the interconnects, in those selected portions. Typically, the user will have the PERC tool create a color map showing the variations in representative current density.

Figure 4A:
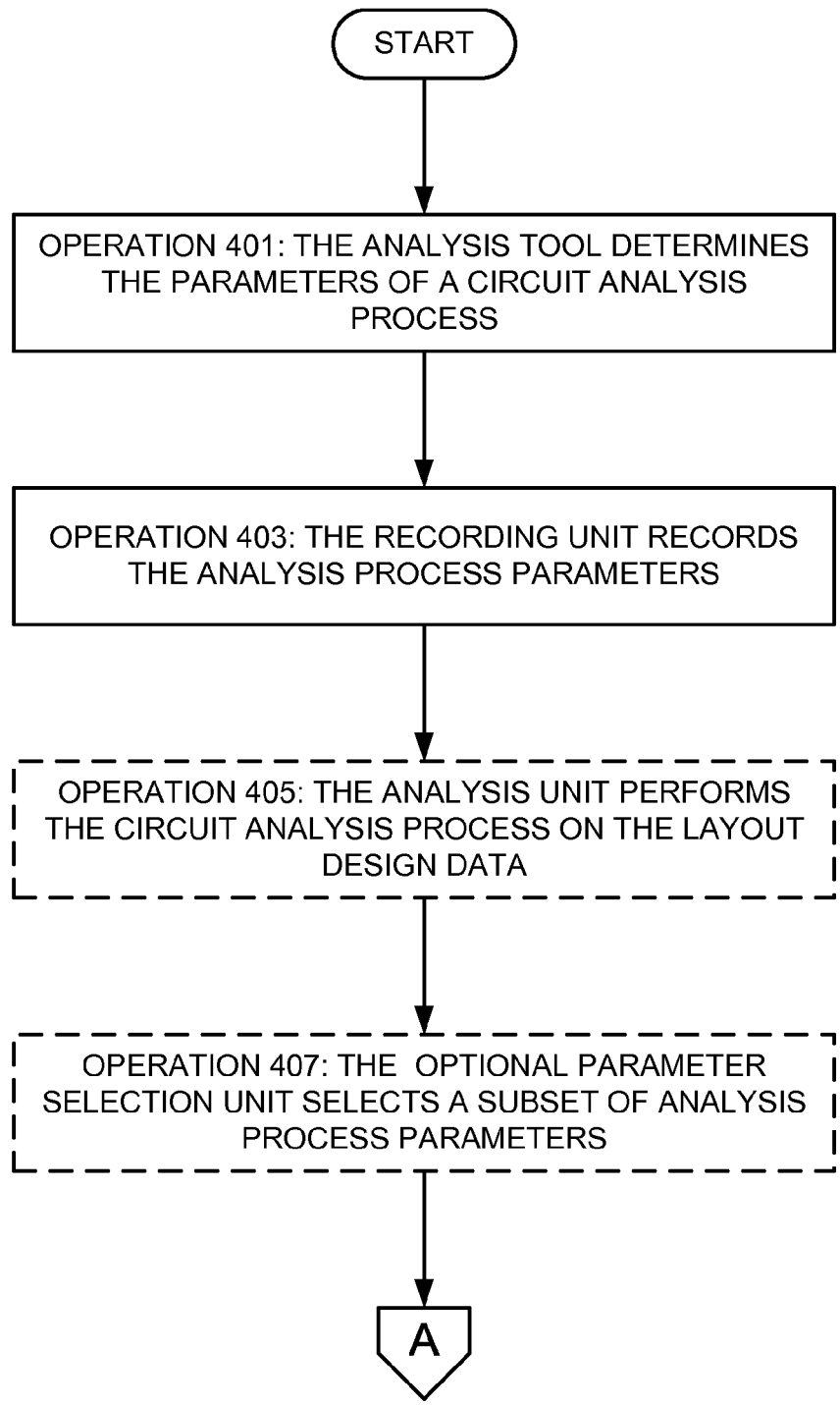
FIGS. 4A and 4B illustrate the operation of a parameter marking tool according to various embodiments of the invention.
Figure 4B:
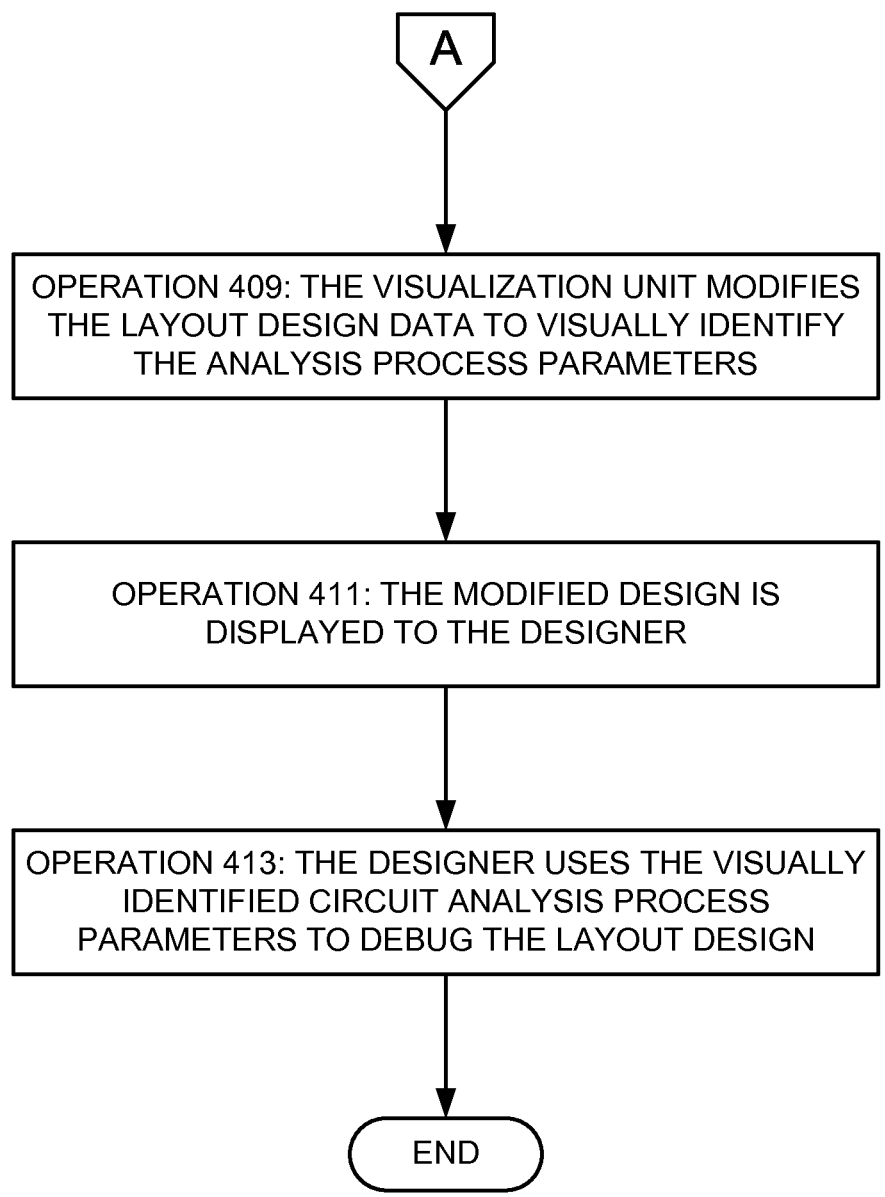

Turning now to FIG. 4, in operation 401, the analysis tool 309 (in the particular example described herein, the PERC tool) determines the parameters of a circuit analysis process for layout data in a layout design. For the electrostatic discharge protection analysis discussed above, the parameters would be the locations of representative current sources, voltage sources and voltage values, the locations of representative voltage sinks, the locations of inter-net connections and the locations of short groups. This information may be collected by, for example, the PERC tool that uses these parameters to perform the electrostatic discharge protection analysis process. Typically, these parameters would be automatically selected by the analysis tool 309, either with or without input from the user of the analysis tool 309, and thus the process of determining the analysis process parameters will not be discussed here in more detail. With various implementations, where the recording unit 303 is separate from the analysis tool 309, the analysis tool 309 will provide analysis process parameters to the recording unit 303.

It should be appreciated that, with layout design data, the parameters for an analysis process typically will be locations in the design associated with geometric elements. Such parameters may include, for example, an edge of a geometric element (e.g., a polygon) in the layout design, a coordinate value along an edge or a geometric element, or a geometric element itself. Accordingly, the analysis process parameters may be defined in any suitable manner. For example, an analysis process parameter may be described as a coordinate value within the special region defined by the layout design data, two coordinate values or other reference value or values identifying an edge of a geometric element, or multiple coordinate values or other reference value or values identifying some portion or the entirety of a geometric element.

In operation 403, the recording unit 303 records the analysis process parameters. With various examples of the invention, the recording unit may record the analysis process parameters by storing circuit analysis information associated with those parameters at a specified location. In some embodiments, the circuit analysis parameter information may be sufficient information to reference the circuit analysis process parameters. For example, if the circuit analysis process parameter is the location of a short group, then the corresponding circuit analysis parameter information may be the location of a device in the group, a uniquely-identifying name of one of the devices in the group, the name of the group itself, or some other pointer to that analysis process parameter in the layout data 311. Alternately, the circuit analysis parameter information may be or include the circuit analysis process parameters themselves. For example, with the electrostatic discharge protection analysis process, the circuit analysis parameter information may be copies of the geometric elements representing the current sources used for the analysis, copies of the geometric elements representing voltage sinks used for the analysis, and copies of the geometric elements representing the inter-net connections and the short groups used for the analysis.

Alternately, the recording unit 303 may record the analysis process parameters by annotating the layout design data 311 itself. For example, with an electrostatic discharge protection analysis process as described above, the analysis process parameters will be the locations representing the current sources used for the analysis, the locations representing voltage sinks used for the analysis, and the locations representing the inter-net connections and the short groups used for the analysis. Each of these locations typically will be associated with at least one geometric element in the layout design data. Accordingly, with these implementations of the invention, the recording unit 303 will annotate the layout design data 311 to identify each of these geometric elements (or a location within these geometric elements) as an analysis process parameter used to perform the analysis.

Further, the recording unit 303 may annotate the layout design data 311 to include context information for each of the analysis process parameters, such as context information identifying its type and the particular process for which it is a parameter. For example, the recording unit 303 may annotate each of multiple geometric elements representing multiple current sources used for a first analysis process as a current source for process P1, and annotate a geometric element representing a short group used for a second analysis process as a short group for process P2. With various embodiments of the invention, the recording unit 303 may use the "properties" annotation techniques described in U.S. Patent Publication No. US2008-0168410, published Jul. 10, 2008, entitled "Properties In Electronic Design Automation," and naming Fedor Pikus et al. as inventors, U.S. Patent Publication No. US2008-0115097 published on May 15, 2008, Fedor G. Pikus et al. as inventors, U.S. Patent Publication No. US2008-0115096, published May 15, 2008, entitled "Properties In Electronic Design Automation," and naming Fedor Pikus as inventor, and U.S. Patent Publication No. US2008-0141193, published Jun. 12, 2008, entitled "Properties In Electronic Design Automation," and naming Fedor Pikus as inventor, each of which publications are incorporated entirely herein by reference.

With some implementations of the invention, the recording unit 303 may be (or be incorporated into) the tool performing the circuit analysis process, as previous noted. For example, with the electrostatic discharge protection analysis process described above, the PERC tool may also be or include the parameter recording unit 303. With these embodiments, in operation 405, the combination analysis tool 309/recording unit 303 performs the circuit analysis process on the layout design data, to obtain results for the circuit analysis process. With alternate implementations of the invention, where the parameter recording unit 303 is separate from the tool performing the circuit analysis process, the circuit analysis process tool performs the circuit analysis process on the layout design data to obtain the process results.

Once the process is completed (or at least has begun to provide results), the user will want to identify and correct any errors in the layout design revealed by the circuit analysis process. To facilitate these corrections, the user may want to review one or more of the circuit analysis process parameters employed to produce the results. Typically, the user will want to display the desired circuit analysis process parameters along with the results of the circuit analysis process, but may not wish to view all of the analysis process parameters. Accordingly, in elective operation 407, the user may employ the optional parameter selection unit 305 to select a subset of analysis process parameters for display.

For example, with the electrostatic discharge protection analysis process described above, the process results will include the current density for various areas in the layout design. The analysis tool 311 may then display a color map showing the variations in current density across the layout design. If a current density for a region exceeds a permitted maximum, the user may wish to revise the layout design to reduce the current density for that region below the maximum permitted amount. To do so, it might be helpful for the user to know the locations of the current sources and the voltage sinks in the layout design portion. Accordingly, with this example, in operation 407 the user may select just the current source locations and the voltage sink locations as the parameters to be displayed with the analysis process results.

With some implementations of the invention, the user may select a subset of analysis process parameters to view before the recording unit 303 records the analysis process parameters for an analysis process. (That is, operation 407 is performed before operation 403.) With these implementations, the recording unit 303 records only those analysis process parameters that have been selected by the user. With still other implementations, however, the recording unit 303 will record all of the analysis process parameters for an analysis process. The visualization unit 307 then employs the selection instructions provided by the optional parameter selection unit 305 to selectively determine which of the recorded analysis process parameters are displayed to a user, as will be explained in more detail below.

Next, in operation 409, the visualization unit 307 modifies the layout design data to mark one or more of the analysis process parameters. For example, with some implementations of the invention employing the Calibre® PERC analysis tool, the PERC analysis tool will produce a database file including the results of the analysis. A layout design display tool, such as the Calibre® DesignRev or Calibre® Workbench tool, will then be used to display the layout design data under analysis. Similarly, a results display tool, such as the Calibre® Results Viewing Environment (RVE) tool will be used to simultaneously display the results of the analysis process provided by the analysis tool. With these implementations, the results provided by the analysis tool 309 may include annotations to the layout design data made by the recording unit 303. The layout design display tool and the results display tool, operating together to implement the visualization unit 307, will then modify the layout design data so that the analysis process parameters (or the selected analysis process parameters) are visually identified for a user. Further, with some implementations of the invention, the visualization unit 307 modifies the layout design data so that context information associated with the analysis process parameters (or the selected analysis process parameters) also are visually identified for a user.

For example, with some implementations of the invention, the visualization unit 307 will modify the layout circuit design to include new design objects or markers marking the circuit analysis process parameters. Thus, if the selected analysis process parameters are current sources, then the visualization unit 307 will modify the layout circuit design to include a marker at each location of a current source. More particularly, the visualization unit 307 may employ the circuit analysis parameter selection information provided by the parameter selection unit 305 to identify instances of selected circuit analysis process parameters from the annotated layout design data. The visualization tool 307 may then add a marker to the layout design data at the location of each identified instance of that circuit analysis process parameter.

Figure 5:
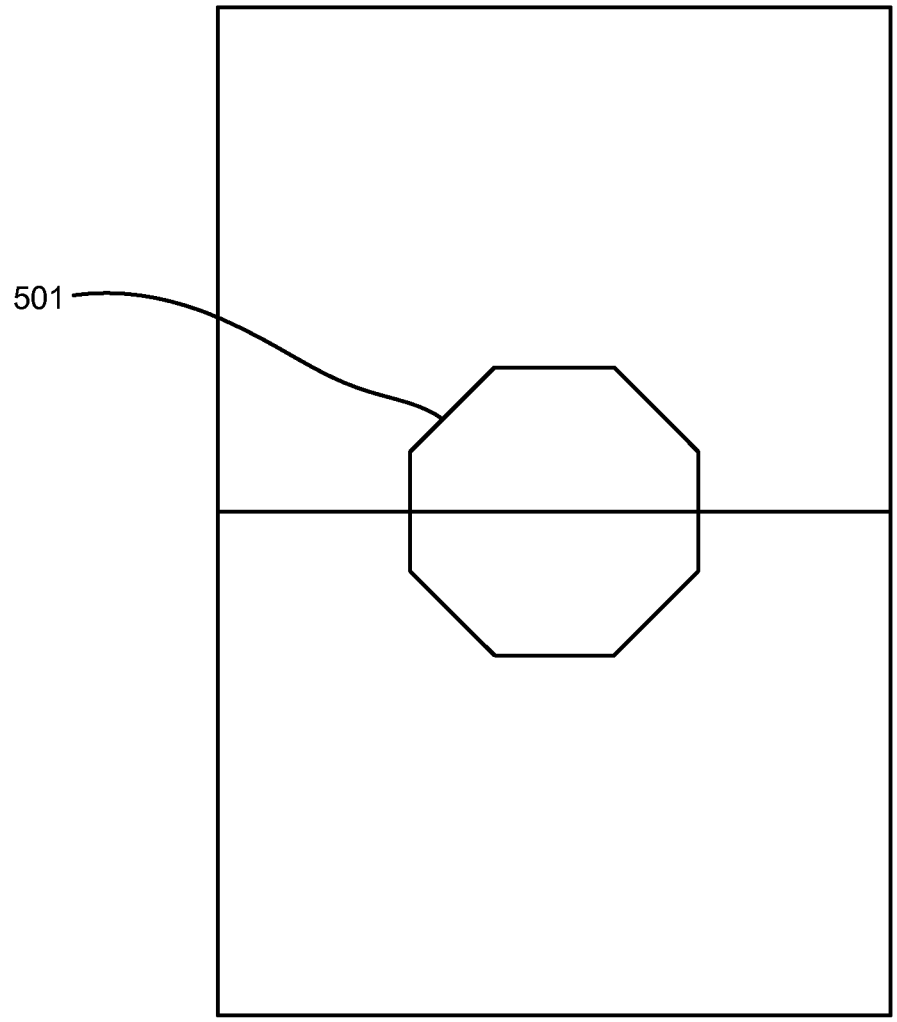
FIG. 5 illustrates a marker for a current source that may be employed according to various embodiments of the invention.
Figure 6:
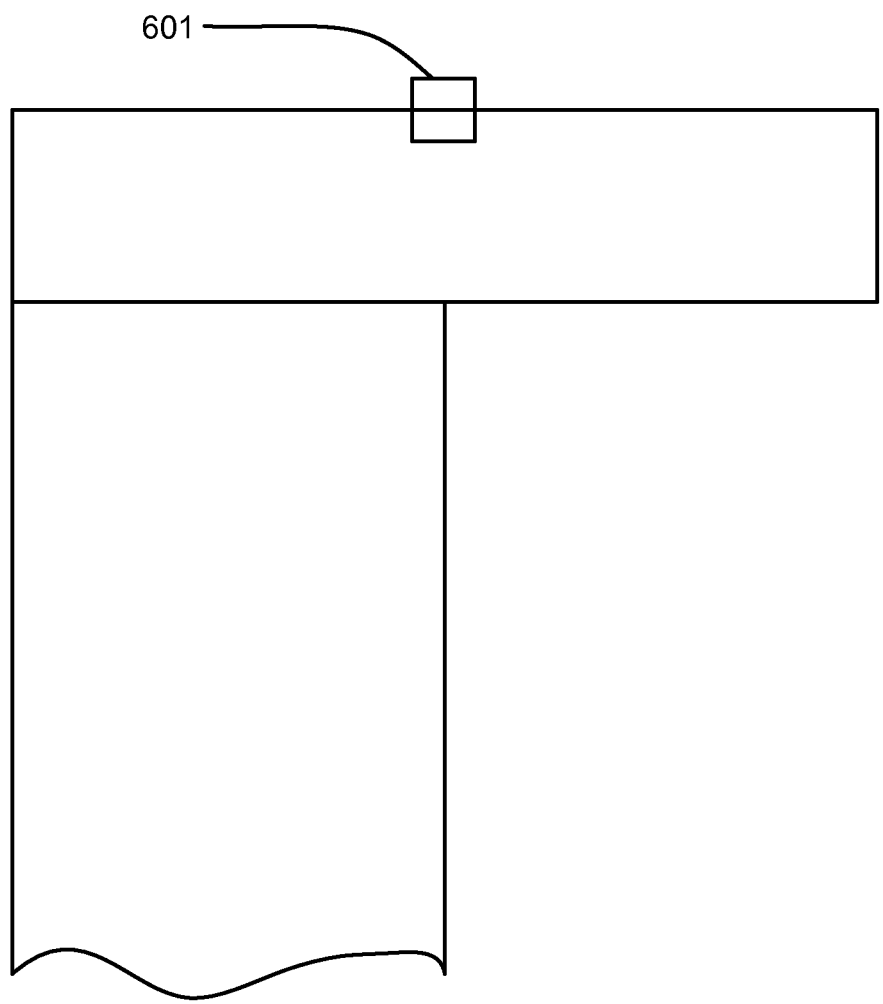
FIG. 6 illustrates a marker for a voltage sink that may be employed according to various embodiments of the invention.
Figure 7:
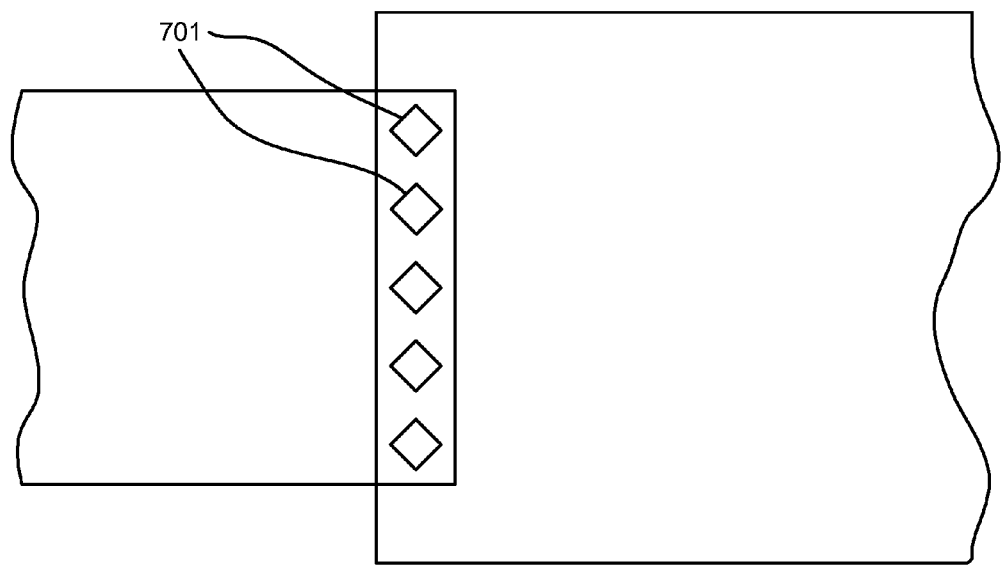
FIG. 7 illustrates a marker for an inter-net connection that may be employed according to various embodiments of the invention.
Figure 8:
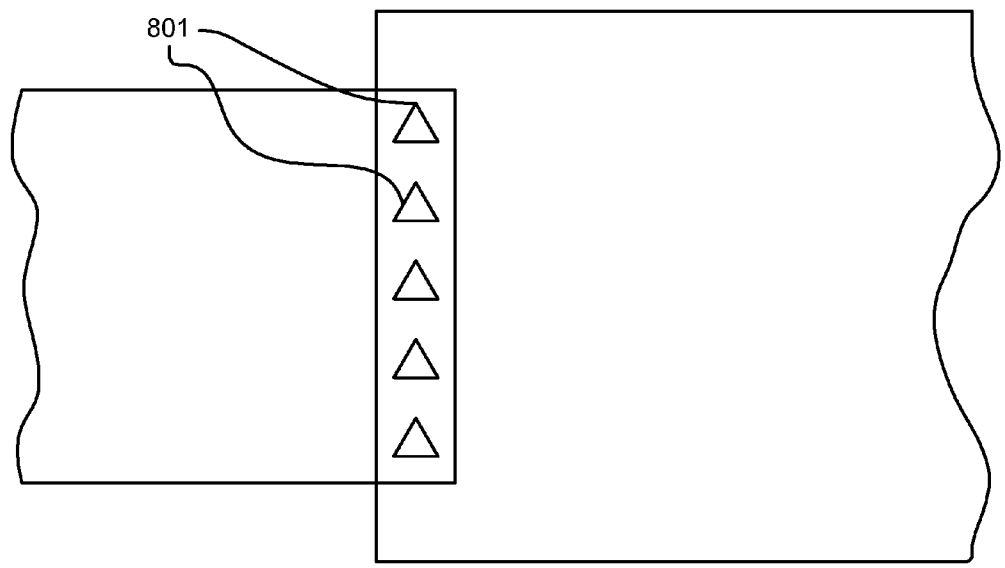
FIG. 8 illustrates a marker for a short group that may be employed according to various embodiments of the invention.

With various implementations of the invention, different types of circuit analysis process parameters may be designated with a different type of marker. For example, with the electrostatic discharge protection analysis process example described above, a current source may be identified with a blue octagon marker 501 as shown in FIG. 5, while a voltage sink may be designated with a yellow square marker 601 as shown in FIG. 6. Similarly, an inter-net connection may be designated with a red diamond marker 701, as shown in FIG. 7, while a device in a short group may be designated with a white or orange triangle 801 as shown in FIG. 8. With some implementations of the invention, the marker may also reflect context information for the identified analysis process parameter, as previously noted. For example, with the triangle marker 801 for a short group shown in FIG. 8, the triangle may have a specific color to designate a direction of current flow (e.g., an orange triangle to show current flow in a first direction, and an orange triangle to show current flow in a second direction).

It should be noted that, with some implementations, the visualization unit 307 may employ alternate techniques to visually identify analysis process parameters. For example, rather than simply modifying the layout design data to include marker data objects, the visualization unit 307 may alternately or additionally modify or mark the geometric elements corresponding to the analysis process parameters. Thus, if an edge of a geometric element was used as a representative current source in an analysis process, the visualization unit 307 may modify that edge of the geometric element so that edge is displayed with a distinctive color or pattern to visually identify it as a representative current source.

As previously noted, with various implementations, the recording unit 303 may record only those analysis process parameters selected by a user through the parameter selection unit 305. With those implementations, recording unit 303 records all of the analysis process parameters for an analysis process, the visualization unit 307 may selectively modify the layout design data to mark only those analysis process parameters selected through the parameter selection unit 305 for visual identification. With still other implementations, however, all of the analysis process parameters for an analysis process may be both recorded by the recording unit 303 and marked by the visualization unit 307. With these implementations, the parameter selection unit 305 may then provide a user interface to allow a user to selectively display the recorded and marked analysis process parameters, such as the user interface 901 illustrated in FIG. 9.

As seen in this figure, the user interface includes a title 903 and a list 905 of analysis process parameter categories ("Sources, Sinks, Connections"). With various implementations, a user can select all of the analysis process parameters in a category by selecting (e.g., "clicking") the name of that category. For example, a user might select the category name "Sink" to have all of the voltage sink analysis process parameters visually identified (by, e.g., displaying the markers associated with those analysis process parameters). Deselecting the name of that category might then hide those analysis process parameters.

The interface 901 also includes the names of specific voltage sources 907, the names of specific sinks 909, and the names of specific short groups 911. With various implementations, a user can select a specific analysis process parameter in by selecting (e.g., "clicking") the name of that parameter. For example, a user might select the name "#1" in the list of short groups to have that particular short group visually identified (by, e.g., displaying the marker or markers associated with that analysis process parameter). Deselecting the name of that analysis process parameter might then hide it. Of course, still other types of user interfaces may be employed to select which analysis process parameters are visually identified to a user.

In any case, once the visualization tool 307 has modified the layout design data to include the relevant markers, the portions of the modified design visually identifying the selected analysis process parameters are displayed to the designer in operation 411. In operation 413, the designer can then use the visually identified circuit analysis process parameters to debug the layout design.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes. Also, while the operations of the disclosed methods are described in a particular sequential order for convenient presentation, it should be understood that this manner of description encompasses rearrangements, unless a particular ordering is required by specific language set forth above. For example, operations described sequentially may in some cases be rearranged or performed concurrently. These and other variations will be appreciated by those of ordinary skill in the art.

What is claimed is:

1. A computer-implemented method, comprising:
  determining analysis process parameters of a circuit analysis process for layout design data describing a layout design of a circuit, wherein the analysis process parameters are associated with representative sources being used in the circuit analysis process;
  recording one or more of the analysis process parameters by storing circuit analysis information associated with the one or more analysis process parameters; and
  modifying the layout design data to provide one or more markers to visually identify one or more of the analysis process parameters.

2. The method of claim 1, further comprising performing the circuit analysis process.

3. The method of claim 1, wherein the circuit analysis process is an electrostatic discharge protection analysis process.

4. The method of claim 1, further comprising receiving a user selection identifying a subset of the analysis process parameters determined, and wherein the modifying the layout design data comprises modifying the layout design data to provide markers for the selected subset of the analysis process parameters.

5. The method of claim 1, wherein the analysis process parameters include one or more of: locations of representative current sources, locations of representative voltage sources, locations of representative voltage sinks, locations of inter-net connections, or locations of short groups.

6. The method of claim 1, wherein the circuit analysis information that is recorded comprises one or more of a location of a device in a short group, a uniquely-identifying name of one of the devices in the short group, or a name of the short group.

7. The method of claim 1, wherein the circuit analysis information that is recorded comprises one or more of copies of geometric elements representing current sources used to perform the circuit analysis, copies of geometric elements representing voltage sinks used to perform the circuit analysis, copies of geometric elements representing inter-net connections used to perform the circuit analysis, or copies of geometric elements representing short groups used to perform the circuit analysis.

8. The method of claim 1, wherein the circuit analysis information that is recorded is sufficient to reference the one or more circuit analysis parameters.

9. The method of claim 1, wherein the recording comprises annotating the layout design data to identify one or more geometric elements or one or more location within the geometric elements as analysis process parameters used to perform the circuit analysis.

10. The method of claim 1, wherein the recording further comprises annotating the layout design to include context information for one or more of the analysis process parameters.

11. The method of claim 10, wherein the context information includes a type identifier and a process identifier.

12. The method of claim 11, wherein the type identified by the type identifier is one of a current source, a voltage source, a voltage sink, an inter-net connection, or a short group.

13. The method of claim 1, wherein the modifying the layout design data to provide one or more markers to visually identify one or more of the analysis process parameters comprises modifying the layout design data to include new design objects or new markers to identify the one or more analysis process parameters.

14. The method of claim 1, wherein the modifying the layout design data to provide one or more markers to visually identify one or more of the analysis process parameters comprises modifying the layout design data to include modified versions of existing geometric elements to identify the one or more analysis process parameters.

15. The method of claim 1, wherein different design objects, markers, or colors are used for different types of analysis process parameters, the different types of circuit analysis process parameters comprises two or more of a current source, a voltage source, a voltage sink, an inter-net connection, or a short group.

16. The method of claim 1, further comprising displaying, via a user interface, the recorded and marked analysis process parameters.

17. The method of claim 1, further comprising displaying the layout design described by the layout design data along with one or more of the markers to visually identify the one or more of the analysis process parameters.

18. The method of claim 17, further comprising receiving data indicating a selection of one or more of the analysis process parameters to visually identify, and wherein the displaying the layout design comprises displaying the markers for the selected analysis process parameters with the layout design.

19. The method of claim 17, further comprising receiving data indicating a deselection of one or more previously-selected analysis process parameters, and wherein the displaying the layout design comprises hiding the markers for the deselected analysis process parameters on the display of layout design.

20. The method of claim 1, further comprising debugging the layout of the circuit design based at least in part on the recorded and marked analysis process parameters.

21. A method of layout design data analysis, comprising:
recording a parameter used in a layout design analysis process, wherein the parameter represents a virtual source that represents a corresponding actual source being applied to a device;
modifying the layout design data for visually indicating the parameter in the layout design data; and
displaying the modified layout design data for use in analyzing the layout design data.

22. The method of claim 21, wherein the layout design analysis process is an electrostatic discharge protection analysis process.

23. The method of claim 21, wherein the parameter is selected from the group consisting of: locations of representative current sources, locations of representative voltage sources, locations of representative voltage sinks, locations of inter-net connections, and locations of short groups.

24. The method of claim 21, wherein the parameter is selected from the group consisting of: a location of a specific representative current source, a location of a specific representative voltage source, a locations of a specific representative voltage sink, a location of a specific inter-net connection, and a locations of a specific short group.

25. The method of claim 21, further comprising
recording a plurality of different parameters used in the layout design analysis process; and
modifying the layout design data for visually distinguishing between the different parameters in the layout design data.

26. The method of claim 25, wherein the modifying the layout design data for visually indicating the parameter in the layout design comprises adding one or more markers to the layout design data, and wherein the one or more markers includes context information for the parameter.

27. A method of layout design data analysis, comprising:
receiving a selection of a subset of parameters used in a layout design analysis process wherein the parameters are associated with location information of a geometric element on a layout design;
modifying the layout design data for visually indicating the subset of parameters in the layout design data; and
displaying modified layout design data for use in analyzing the layout design data.

28. The method of claim 27, further comprising
selectively recording parameters used in a layout design analysis process based upon the received selection of a subset of the parameters.

29. The method of claim 27, further comprising
recording the parameters used in a layout design analysis process; and
selectively modifying the layout design data for visually indicating the subset of parameters in the layout design data.

30. The method of claim 27, further comprising
modifying the layout design data to include markers for visually indicating the parameters in the layout design data; and
displaying only the markers for visually indicating the selected subset of parameters.

* * * * *